(12) United States Patent
Chen et al.

(10) Patent No.: US 11,112,908 B2
(45) Date of Patent: Sep. 7, 2021

(54) METHOD OF DETERMINING WHETHER TOUCH DATA VALID, AND DEVICE AND STORAGE MEDIUM FOR THE SAME

(71) Applicants: Hefei BOE Optoelectronics Technology Co., Ltd., Anhui (CN); BOE Technology Group Co., Ltd., Beijing (CN)

(72) Inventors: Cheng Chen, Beijing (CN); Yufei Hu, Beijing (CN); Yifei Zhan, Beijing (CN); Feng Yang, Beijing (CN); Youshan Hou, Beijing (CN)

(73) Assignees: HEFEI BOE OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/906,183

(22) Filed: Jun. 19, 2020

(65) Prior Publication Data
US 2021/0191596 A1    Jun. 24, 2021

(30) Foreign Application Priority Data
Dec. 20, 2019    (CN) .......................... 201911328501.1

(51) Int. Cl.
*G06F 3/041*    (2006.01)
(52) U.S. Cl.
CPC ........ *G06F 3/04186* (2019.05); *G06F 3/0412* (2013.01); *G06F 2203/04104* (2013.01)

(58) Field of Classification Search
CPC ............... G06F 3/04186; G06F 3/0412; G06F 2203/04104
See application file for complete search history.

(56) References Cited

U.S. PATENT DOCUMENTS

2017/0097723 A1*    4/2017 Ogawa .................. G06F 3/0412

* cited by examiner

*Primary Examiner* — Yaron Cohen
(74) *Attorney, Agent, or Firm* — Westman, Champlin & Koehler, P.A.

(57) ABSTRACT

The present disclosure provides a touch data processing method, a device and a storage medium. Here, the touch data processing method includes: acquiring a first touch signal detected by a touch screen during a first detection period, and obtaining a first finger model according to the first touch signal; acquiring a second finger model which is obtained according to a second touch signal detected by the touch screen during a second detection period, wherein each of the first finger model and the second finger model comprises an area where a finger is in contact with the touch screen and touch data corresponding to respective sub-areas in the area; determining whether the finger is separated from the touch screen according to a change amount of first touch data in the first finger model relative to second touch data in the second finger model; and determining the first touch data to be valid touch data and reporting the first touch data in response to the finger not being separated from the touch screen, and determining the first touch data to be invalid touch data in response to the finger being separated from the touch screen.

9 Claims, 6 Drawing Sheets

| 10 | 34 | 68 | 36 | 22 | 4 |
|----|----|----|----|----|----|
| 12 | 24 | 94 | 26 | 20 | 4 |
| 0 | 30 | 96 | 58 | 14 | 2 |
| 2 | 14 | 90 | 74 | 38 | 6 |
| 0 | 8 | 42 | 90 | 94 | 12 |
| 0 | 8 | 38 | 84 | 54 | 12 |
| 0 | 12 | 36 | 168 | 28 | 6 |
| 0 | 12 | 34 | 68 | 66 | 10 |
| 0 | 8 | 8 | 16 | 22 | 2 |

| 24 | 78 | 16 | 12 | 0 | 0 |
|----|----|----|----|---|---|
| 18 | 68 | 32 | 10 | 2 | 0 |
| 6  | 54 | 48 | 30 | 4 | 0 |
| 4  | 28 | 64 | 78 | 10 | 6 |
| 0  | 20 | 40 | 20 | 6 | 2 |
| 4  | 18 | 130 | 20 | 6 | 0 |
| 4  | 12 | 42 | 56 | 6 | 0 |
| 10 | 10 | 14 | 20 | 8 | 6 |
| 0  | 0  | 0  | 0  | 0 | 0 |

METHOD OF DETERMINING WHETHER TOUCH DATA VALID, AND DEVICE AND STORAGE MEDIUM FOR THE SAME

CROSS-REFERENCE TO RELATED APPLICATION(S)

This application claims priority to the Chinese Patent Application No. 201911328501.1, filed on Dec. 20, 2019, which is incorporated herein by reference in its entirety.

TECHNICAL FIELD

The present disclosure relates to the field of touch technology, and more particularly, to a touch data processing method, a device, and a storage medium.

BACKGROUND

Currently, when touch products are tested, produced, or used by customers, related touch operations such as finger pressing and clicking etc. may be performed on the touch products. However, due to problems such as the products themselves, inter-finger interference of users, and heavy sweating of users' hands, there may be problems of occurrence of a touch report at a non-touch position after a finger is separated from a touch screen, which affects the customers' use, test results or even product performance.

SUMMARY

According to a first aspect of the embodiments of the present disclosure, there is provided a touch data processing method, comprising:

acquiring a first touch signal detected by a touch screen during a first detection period, and obtaining a first finger model according to the first touch signal;

acquiring a second finger model which is obtained according to a second touch signal detected by the touch screen during a second detection period, wherein the first touch signal and the second touch signal are touch signals detected within the same area range, each of the first finger model and the second finger model comprises an area where a finger is in contact with the touch screen and touch data corresponding to respective sub-areas in the area, the second detection period is prior to the first detection period and is adjacent to the first detection period, and the touch data in the second finger model is valid touch data;

determining whether the finger is separated from the touch screen according to a change amount of first touch data in the first finger model relative to second touch data in the second finger model; and determining the first touch data to be valid touch data in response to the finger not being separated from the touch screen, and determining the first touch data to be invalid touch data in response to the finger being separated from the touch screen.

In an embodiment, determining whether the finger is separated from the touch screen according to a change amount of first touch data in the first finger model relative to second touch data in the second finger model comprises:

calculating a first sum of values of touch data corresponding to the respective sub-areas in the first finger model;

calculating a second sum of values of touch data corresponding to the respective sub-areas in the second finger model;

calculating a ratio of the second sum to the first sum; and determining that the finger is not separated from the touch screen in response to the ratio of the second sum to the first sum being not greater than a first threshold.

In an embodiment, the method further comprises:

determining whether a value of first central touch data in a central sub-area in the first finger model is greater than a second threshold in response to the ratio of the second sum to the first sum being greater than the first threshold; and determining that the finger is not separated from the touch screen in response to the value of the first central touch data being greater than the second threshold.

In an embodiment, the method further comprises:

stopping acquiring the touch signal detected by the touch screen for preset duration and then acquiring a touch signal detected by the touch screen again in response to the value of the first central touch data being not greater than the second threshold;

obtaining a third finger model according to the further acquired touch signal detected by the touch screen, wherein the further acquired touch signal detected by the touch screen and the first touch signal are touch signals detected within the same area range;

determining whether a value of second central touch data in a central sub-area in the third finger model is greater than the second threshold; and determining that the finger is not separated from the touch screen and determining the touch data in the second finger model to be valid touch data in response to the value of the second central touch data being greater than the second threshold, and determining that the finger is separated from the touch screen and determining the touch data in the second finger model and the third finger model to be invalid touch data in response to the value of the second central touch data being not greater than the second threshold.

In an embodiment, the touch data in the second finger model is determined to be valid touch data by:

in response to no other touch signals being detected by the touch screen within a preset number of detection periods before the second touch signal is detected by the touch screen, determining whether a value of third central touch data in the central sub-area in the second finger model is greater than a third threshold; and determining the touch data in the second finger model to be valid touch data in response to the value of the third central touch data being greater than the third threshold, wherein the third threshold is less than the second threshold.

According to a second aspect of the embodiments of the present disclosure, there is provided an electronic device, comprising:

a processor; and a memory having stored therein instructions which, when executed by the processor, cause the processor to:

acquire a first touch signal detected by a touch screen during a first detection period, and obtain a first finger model according to the first touch signal;

acquire a second finger model which is obtained according to a second touch signal detected by the touch screen during a second detection period, wherein the first touch signal and the second touch signal are touch signals detected within the same area range, each of the first finger model and the second finger model comprises an area where a finger is in contact with the touch screen and touch data corresponding to respective sub-areas in the area, the second detection period is prior to the first detection period and is adjacent to the first detection period, and the touch data in the second finger model is valid touch data;

determine whether the finger is separated from the touch screen according to a change amount of first touch data in the first finger model relative to second touch data in the second finger model; and determine the first touch data to be valid touch data in response to the finger not being separated from the touch screen, and determine the first touch data to be invalid touch data in response to the finger being separated from the touch screen.

In an embodiment, the instructions which, when executed by the processor, further cause the processor to:

calculate a first sum of values of touch data corresponding to the respective sub-areas in the first finger model;

calculate a second sum of values of touch data corresponding to the respective sub-areas in the second finger model;

calculate a ratio of the second sum to the first sum; and determine that the finger is not separated from the touch screen in response to the ratio of the second sum to the first sum being not greater than a first threshold.

In an embodiment, the instructions which, when executed by the processor, further cause the processor to:

determine whether a value of first central touch data in a central sub-area in the first finger model is greater than a second threshold in response to the ratio of the second sum to the first sum being greater than the first threshold; and determine that the finger is not separated from the touch screen in response to the value of the first central touch data being greater than the second threshold.

In an embodiment, the instructions which, when executed by the processor, further cause the processor to:

stop acquiring the touch signal detected by the touch screen for preset duration and then acquire a touch signal detected by the touch screen again in response to the value of the first central touch data being not greater than the second threshold;

obtain a third finger model according to the further acquired touch signal detected by the touch screen, wherein the further acquired touch signal detected by the touch screen and the first touch signal are touch signals detected within the same area range;

determine whether a value of second central touch data in a central sub-area in the third finger model is greater than the second threshold; and determine that the finger is not separated from the touch screen and determine the touch data in the second finger model to be valid touch data in response to the value of the second central touch data being greater than the second threshold, and determine that the finger is separated from the touch screen and determine the touch data in the second finger model and the third finger model to be invalid touch data in response to the value of the second central touch data being not greater than the second threshold.

In an embodiment, the instructions which, when executed by the processor, further cause the processor to:

in response to no other touch signals being detected by the touch screen within a preset number of detection periods before the second touch signal is detected by the touch screen, determine whether a value of third central touch data in the central sub-area in the second finger model is greater than a third threshold; and determine the touch data in the second finger model to be valid touch data in response to the value of the third central touch data being greater than the third threshold, wherein the third threshold is less than the second threshold.

According to a third aspect of the embodiments of the present disclosure, there is provided a non-transitory computer-readable storage medium having stored therein computer instructions for causing a computer to perform the any touch data processing method according to the first aspect of the present disclosure.

BRIEF DESCRIPTION OF THE ACCOMPANYING DRAWINGS

In order to more clearly explain the technical solutions in the embodiments of the present disclosure or the related art, the accompanying drawings required to be used in the description of the embodiments or the related art will be briefly introduced below. Obviously, the accompanying drawings in the following description are only some embodiments of the present disclosure. Other accompanying drawings may be obtained by those of ordinary skill in the art according to these accompanying drawings without any creative work.

FIG. 2 is a schematic diagram of an example of a finger model which is obtained according to a touch signal detected by a touch screen according to an exemplary embodiment of the present disclosure;

FIG. 3 is a schematic diagram of an example of a finger model which is obtained according to a touch signal detected by a touch screen according to an exemplary embodiment of the present disclosure;

FIG. 4 is a schematic diagram of an example of a finger model which is obtained according to a touch signal detected by a touch screen according to an exemplary embodiment of the present disclosure;

DETAILED DESCRIPTION

In order to make the purpose, technical solutions and advantages of the present disclosure more clear, the present disclosure will be further described in detail in conjunction with specific embodiments and with reference to the accompanying drawings.

It should be illustrated that, unless otherwise defined, the technical terms or scientific terms used in the embodiments of the present disclosure should have the usual meanings understood by those skilled in the art to which the present disclosure belongs. The terms "first", "second" and similar words used in the present disclosure do not indicate any order, quantity or importance, but are only used to distinguish different components. Similar words such as "comprise" or "include" mean that an element or item appearing before the word cover elements or items listed after the word and their equivalents, but do not exclude other elements or items. "Connected with" or "connected to" and similar words are not limited to physical or mechanical connections, but may include electrical connections, whether direct or indirect. "Up", "down", "left", "right", etc. are only used to indicate a relative positional relationship. After absolute positions of objects described change, the relative positional relationship may also change accordingly.

In a scenario of an exemplary embodiment of the present disclosure, when a finger is pressed onto a touch screen, a system may feed back touch data to the system according to a capacitance value detected within an area where the finger is pressing, but in a case of multi-finger touch, when a user moves the finger away from the touch screen, since sweat on the finger may remain on the touch screen, it may cause occurrence of misreporting on the touch screen. In the touch data processing method according to the embodiment of the present disclosure, after a first finger model is obtained according to a touch signal detected by the touch screen, it may be determined whether touch data in the first finger model is valid touch data according to a change amount of the touch data in the first finger model relative to touch data in a second finger model which is acquired last time. In this way, it may be ensured that touch data is reported in a case where the touch data is valid data, which may reduce interference between touch signals and interference with a touch signal due to other factors, thereby improving the stability of the touch system.

Figure 1:
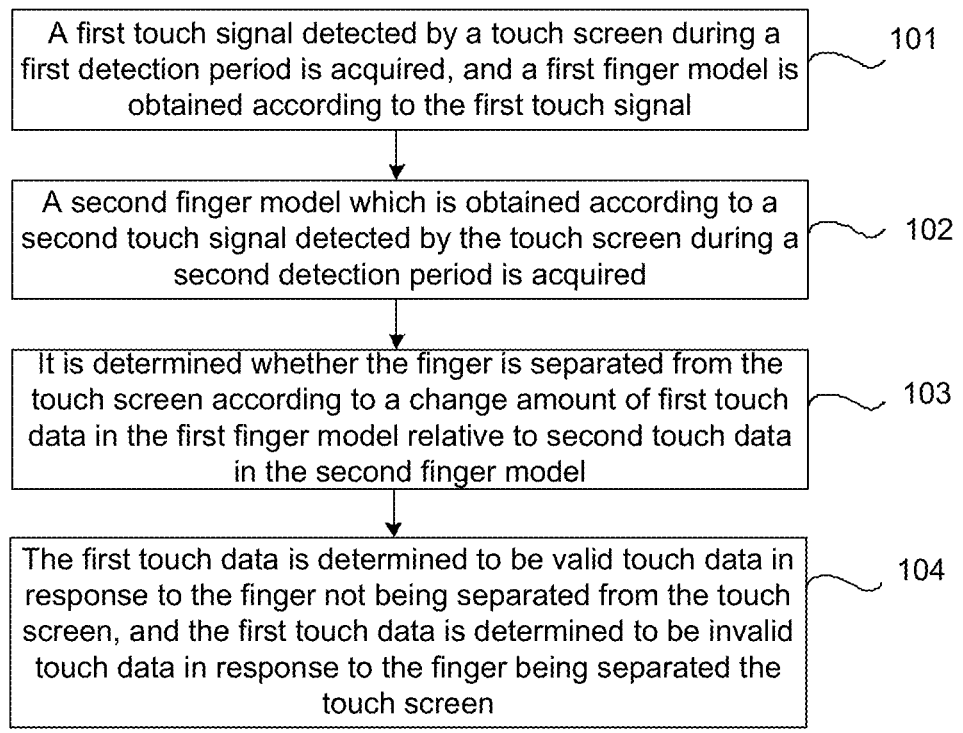
FIG. 1 is a flowchart of a touch data processing method according to an exemplary embodiment of the present disclosure.

FIG. 1 is a flowchart of a touch data processing method according to an exemplary embodiment of the present disclosure. The method may be executed by a terminal. As shown in FIG. 1, the method comprises the following steps.

In step 101, a first touch signal detected by a touch screen during a first detection period is acquired, and a first finger model is obtained according to the first touch signal, wherein the first finger model comprises an area where a finger is in contact with the touch screen and touch data corresponding to respective sub-areas in the area.

For example, FIG. 2 illustrates an example of a first finger model obtained according to a first touch signal detected by a touch screen. As shown in FIG. 2, a finger model 21 obtained at time t1 is an example of the first finger model described above. As shown in FIG. 2, the first finger model 21 comprises a rectangular area, which is used to characterize an area where the finger is in contact with the touch screen. The area is divided into nine squares. Values in the nine squares represent values (capacitance values for short hereinafter) which are converted from capacitance values generated by the finger being pressed on the touch screen through an Analog-to-Digital Converter (ADC). One of the nine squares is also called a sub-area. In the example shown in FIG. 2, touch data corresponding to the respective sub-areas are capacitance values corresponding to the respective sub-areas.

In step 102, a second finger model which is obtained according to a second touch signal detected by the touch screen during a second detection period is acquired, wherein the first touch signal and the second touch signal are touch signals detected within the same area range, each of the first finger model and the second finger model comprises an area where the finger is in contact with the touch screen and touch data corresponding to respective sub-areas in the area, the second detection period is prior to the first detection period and is adjacent to the first detection period, and the touch data in the second finger model is valid touch data.

Figure 3:
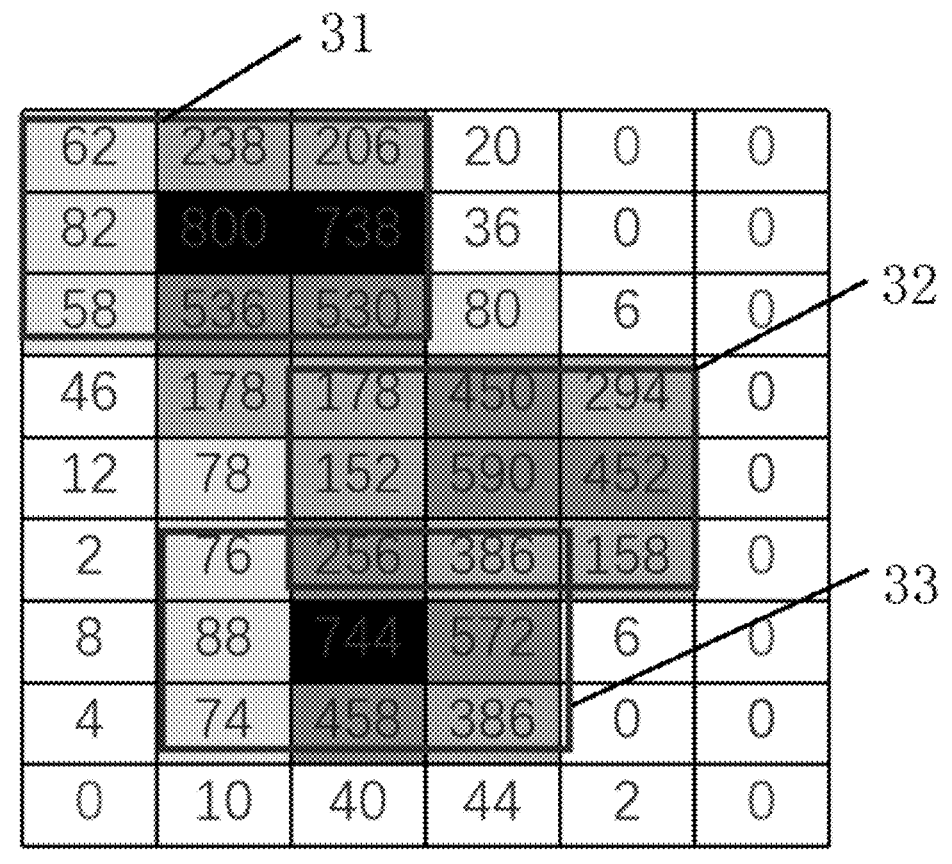

For example, in a case of multi-finger touch, multiple finger models may be obtained according to touch signals detected by a touch screen. FIG. 3 illustrates an example in which multiple finger models are obtained according to touch signals detected during multi-finger touch. As shown in FIG. 3, a finger model 31, a finger model 32, and a finger model 33 are obtained according to touch signals detected by the touch screen at time t2, wherein the finger model 33 is an example of the second finger model. As shown in FIG. 3, a position of the finger model 33 on the touch screen is substantially the same as that of the first finger model 21 shown in FIG. 2 on the touch screen, that is, the second finger model acquired in step 102 is a finger model which is located within the same area range as that of the first finger model described above. An area range may be, for example, an area range of preset rows/columns which exceed an area occupied by one finger model in four directions that is, an upward direction, a downward direction, a direction to the left, and a direction to the right. It should be illustrated that, for example, the touch screen collects touch data during one preset period, wherein the time t1 and the time t2 may be separated by at least one preset period.

In step 103, it is determined whether the finger is separated from the touch screen according to a change amount of first touch data in the first finger model relative to second touch data in the second finger model.

For example, still by using the examples shown in FIG. 2 and FIG. 3, the change amount of the first touch data relative to the second touch data may be determined according to a ratio of a sum of all capacitance values in the second finger model to a sum of all capacitance values in the first finger model. Alternatively, the change amount of the first touch data relative to the second touch data may also be determined according to a ratio of a capacitance value at a center of nine squares in the second finger model relative to a capacitance value at a center of nine squares in the first finger model or a difference therebetween. It may be determined that the finger is not separated from the touch screen when the change amount therebetween does not exceed a certain preset value, and it may be determined that the finger is separated from the touch screen when the change amount therebetween exceeds the certain preset value.

In step 104, the first touch data is determined to be valid touch data in response to the finger not being separated from the touch screen, and the first touch data is determined to be invalid touch data in response to the finger being separated the touch screen.

For example, when it is determined that the condition in step 103 is satisfied, it is determined that the finger is not separated from the touch screen, and the obtained first touch data may be processed to report a touch result. For example, when it is determined that the condition in step 103 is not satisfied, it is determined that the finger is separated from the touch screen, and the first touch data is not processed.

With the touch data processing method according to the embodiment of the present disclosure, after the first finger model is obtained according to the touch signal detected by the touch screen, it may be determined whether touch data in the first finger model is valid touch data according to a change amount of the touch data in the first finger model relative to touch data in a second finger model which is obtained last time. In this way, it may be ensured that touch data is reported in a case where the touch data is valid data, which may reduce interference between touch signals and interference with a touch signal due to other factors, thereby improving the stability of the touch system.

In one possible implementation, determining whether the finger is separated from the touch screen according to a change amount of first touch data in the first finger model relative to second touch data in the second finger model may comprise: calculating a first sum of values of touch data corresponding to the respective sub-areas in the first finger model; calculating a second sum of values of touch data corresponding to the respective sub-areas in the second finger model; calculating a ratio of the second sum to the first sum; and determining that the finger is not separated from the touch screen in response to the ratio of the second sum to the first sum being not greater than a first threshold.

In one possible implementation, it is determined that the finger is separated from the touch screen in response to the ratio of the second sum to the first sum being greater than the first threshold. For example, assuming that the preset first threshold is 150%, as shown in FIG. 2, the sum of the capacitance values in the finger model 21 which is obtained based on the touch signal detected by the touch screen is 576 at time t1, and as shown in FIG. 3, the sum of the touch data in the finger model 33 corresponding to the position of the finger model 21 which is obtained based on the touch signal detected by the touch screen is 3040 at time t2, and a ratio therebetween is 3040/576=528%. Since 528%>150%, it may be determined that the finger is separated from the touch screen.

In an exemplary implementation scenario of the present disclosure, assuming that the finger has actually been separated from the touch screen at time t1, the capacitance values in the finger model 21 obtained according to the touch signal detected by the touch screen may decrease as compared with the capacitance values in the finger model 33 obtained at time t2. However, the capacitance values in the respective sub-areas in the finger model 21 are inconsistent, and the sweat on the finger may further cause the capacitance values in the respective sub-areas in the finger model 21 to decrease. Therefore, assuming that an initial touch threshold set by the system is 100, then at time t1, since the capacitance value in a central area of the finger model 21 is 168 which is greater than 100, the acquired touch data may still be reported to the system at time t1, but since the position of the second touch signal has changed at this time, there may be a problem of misreporting. It may be seen that the system needs to further make determination on the touch data to prevent occurrence of this kind of misreporting. Based thereon, the above touch data processing method may further comprise: after determining that the ratio of the second sum to the first sum is greater than the first threshold, determining whether a value of first central touch data in a central sub-area in the first finger model is greater than a second threshold; and determining that the finger is not separated from the touch screen in response to the value of the first central touch data being greater than the second threshold.

In one possible implementation, in response to the value of the first central touch data being not greater than the second threshold, in the scenario of the above exemplary embodiment, since the initial touch threshold set by the system is 100 (however, in the present embodiment, the initial touch threshold is not limited thereto), the problem of misreporting may not be avoided according to the threshold. Therefore, the touch threshold of the system is increased to a second threshold, which is 200 (however, in the present embodiment, the second threshold is not limited thereto). As shown in FIG. 2, the first central touch data in the central sub-area of the finger model 21 is 168, which is less than 200. At this time, it may be determined that the finger is separated from the touch screen. Based on the touch threshold which is reset and based on the determination according to the touch threshold which is reset, the problem of misreporting may be effectively avoided, and the problem of abnormality during line drawing may be improved, thereby optimizing the touch effect.

In one possible implementation, the touch data in the second finger model is determined to be valid touch data. Based thereon, the validity of the determined touch data after steps 101 to 104 are performed may be ensured. Based thereon, the above touch data processing method may further comprise: before acquiring the first touch signal detected by the touch screen and obtaining the first finger model according to the first touch signal, acquiring a second touch signal detected by the touch screen, and obtaining a second finger model according to the second touch signal, wherein no other touch signals are detected by the touch screen within a preset number of detection periods before the second touch signal is detected by the touch screen; determining whether a value of third central touch data in the central sub-area in the second finger model is greater than a third threshold; and determining the touch data in the second finger model to be valid touch data in response to the value of the third central touch data being greater than the third threshold, wherein the third threshold is less than the second threshold. For example, in the above example, the third threshold is, for example, 100, and the second threshold is, for example, 200; however, the present embodiment is not limited thereto.

In one possible implementation, the above touch data processing method may further comprise: stopping acquiring the touch signal detected by the touch screen for a preset duration and then acquiring a touch signal detected by the touch screen again in response to the value of the first central touch data being not greater than the second threshold; obtaining a third finger model according to the further acquired touch signal detected by the touch screen, wherein the further acquired touch signal detected by the touch screen and the first touch signal are touch signals detected within the same area range; determining whether a value of second central touch data in a central sub-area in the third finger model is greater than the second threshold; and determining that the finger is not separated from the touch screen in response to the value of the second central touch data being greater than the second threshold, and determining that the finger is separated from the touch screen in response to the value of the second central touch data being not greater than the second threshold. For example, after determining that the value of the first central touch data is greater than the second threshold, the procedure may wait for 30 ms (which is one example of the preset time above). Finger model data obtained at time t3 is shown as a finger model 41 in FIG. 4. A capacitance value (which is one example of the above second central touch data) in a central sub-area of the finger model 41 is 130, which is less than 200, and it may be determined that the finger is separated from the touch screen. Therefore, the touch data detected at the time t1 and the time t3 may not be reported to the system, that is, touch points may not be reported to the system, and only the touch data detected at the time t2 may be reported to the system. Assuming that the capacitance value in the central sub-area of the finger model obtained at the time t3 is greater than 200, it may be determined that the finger is not separated from the touch screen, and the touch data in the finger model obtained at the time 1 is determined to be valid touch data and is reported to the system.

Figure 5:
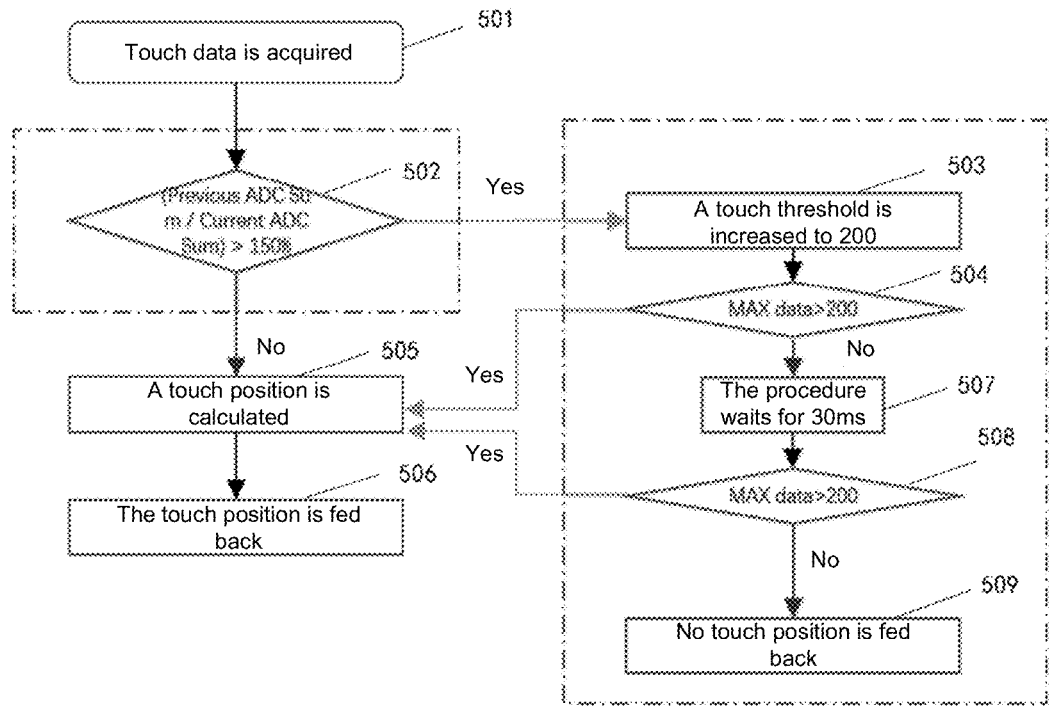
FIG. 5 is a flowchart of a touch data processing method according to an exemplary embodiment of the present disclosure.

FIG. 5 is a flowchart of a touch data processing method according to an exemplary embodiment of the present disclosure. As shown in FIG. 5, the method comprises the following steps. In step 501, touch data is acquired. In step 502, it is determined whether Previous ADC sum/Current ADC Sum is greater than 150%, and if so, it is considered that there is condition that a finger is separated (that is, the finger is separated from a touch screen); and if not, it is considered that there is no condition that the finger is separated (that is, the finger is not separated from the touch screen), wherein Previous ADC sum is a sum of touch data in a finger model in a previous frame, and Current ADC Sum is a sum of touch data in the finger model in a current frame. In order to further make determination on the touch data after the condition that the finger is separated exists, in step 503, the touch threshold is increased to 200, and in step 504, it is determined whether a capacitance value at a center of the finger model in the current frame is greater than 200. If the capacitance value is greater than 200, it is considered that there is a state in which a finger is pressed, but the pressure may be reduced; in step 505, a touch position is calculated; and in step 506, the touch position is fed back to the system. If the capacitance value is less than 200, it is considered that the finger is separated from the touch screen, and in step 507, collection of touch data is stopped for a period of time (for example, 30 ms). In step 508, after 30 ms, it is determined again whether the capacitance value at the center of the finger model obtained based on the acquired touch signal is greater than 200. If the capacitance value is greater than 200, it is considered that the finger is still being pressed, and a touch position is calculated and fed back. If the capacitance value is less than 200, in step 509, it is determined that the finger is not pressed and the finger has been separated from the touch screen, and the touch position is not fed back. In this way, the problem of misreporting during slow decline of touch data caused by problems such as inter-finger interference or residual sweat of hands etc. may be avoided.

Figure 6:
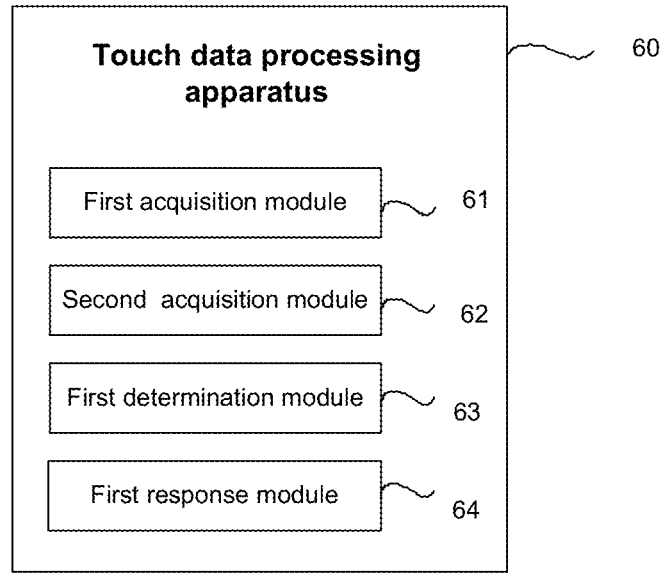
FIG. 6 is a block diagram of a touch data processing apparatus according to an exemplary embodiment of the present disclosure.

FIG. 6 is a block diagram of a touch data processing apparatus according to an exemplary embodiment. As shown in FIG. 6, the device 60 comprises:

a first acquisition module 61 configured to acquire a first touch signal detected by a touch screen during a first detection period, and obtain a first finger model according to the first touch signal;

a second acquisition module 62 configured to acquire a second finger model which is obtained according to a second touch signal detected by the touch screen during a second detection period, wherein the first touch signal and the second touch signal are touch signals detected within the same area range, each of the first finger model and the second finger model comprises an area where a finger is in contact with the touch screen and touch data corresponding to respective sub-areas in the area, the second detection period is prior to the first detection period and is adjacent to the first detection period, and the touch data in the second finger model is valid touch data;

a first determination module 63 configured to determine whether the finger is separated from the touch screen according to a change amount of first touch data in the first finger model relative to second touch data in the second finger model; and a first response module 64 configured to determine the first touch data to be valid touch data in response to the finger not being separated from the touch screen, and determine the first touch data to be invalid touch data in response to the finger being separated from the touch screen.

In one possible implementation, the first determination module may comprise: a first calculation unit configured to calculate a first sum of values of touch data corresponding to the respective sub-areas in the first finger model; a second calculation unit configured to calculate a second sum of values of touch data corresponding to the respective sub-areas in the second finger model; a third calculation unit configured to calculate a ratio of the second sum to the first sum; and a response unit configured to determine that the finger is not separated from the touch screen in response to the ratio of the second sum to the first sum being not greater than a first threshold.

The response unit is further configured to determine that the finger is separated from the touch screen in response to the ratio of the second sum to the first sum being greater than the first threshold.

In one possible implementation, the touch data processing apparatus may further comprise: a second determination module configured to, after determining that the ratio of the second sum to the first sum is greater than the first threshold, determine whether a value of first central touch data in a central sub-area in the first finger model is greater than a second threshold; and a second response module configured to determine that the finger is not separated from the touch screen in response to the value of the first central touch data being greater than the second threshold.

In one possible implementation, the touch data processing apparatus may further comprise: a third acquisition module configured to stop acquiring the touch signal detected by the touch screen for preset duration and then acquire a touch signal detected by the touch screen again in response to the value of the first central touch data being not greater than the second threshold; an obtaining module configured to obtain a third finger model according to the further acquired touch signal detected by the touch screen, wherein the further acquired touch signal detected by the touch screen and the first touch signal are touch signals detected within the same area range; a third determination module configured to determine whether a value of second central touch data in a central sub-area in the third finger model is greater than the second threshold; and a third response module configured to determine that the finger is not separated from the touch screen and determine the touch data in the second finger model to be valid touch data in response to the value of the second central touch data being greater than the second threshold, and determine that the finger is separated from the touch screen and determine the touch data in the second finger model and the third finger model to be invalid touch data in response to the value of the second central touch data being not greater than the second threshold.

In one possible implementation, the touch data processing apparatus may further comprise: a fourth acquisition module configured to, before acquiring the first touch signal detected by the touch screen and obtaining the first finger module according to the first touch signal, acquire a second touch signal detected by the touch screen, and obtain a second finger model according to the second touch signal, wherein no other touch signals are detected by the touch screen within a preset number of detection periods before the second touch signal is detected by the touch screen, a fourth determination module configured to determine whether a value of third central touch data in the central sub-area in the second finger model is greater than a third threshold; and a fourth response module configured to determine the touch data in the second finger model to be valid touch data and report the touch data in response to the value of the third central touch data being greater than the third threshold, wherein the third threshold is less than the second threshold.

It should be illustrated that the method according to the embodiment of the present disclosure may be executed by a single device, for example, a computer or a server etc. The method according to the present embodiment may also be applied in a distributed scenario, and is completed by multiple devices cooperating with each other. In a case of such a distributed scenario, one of the multiple devices may only perform one or more steps in the method according to the embodiment of the present disclosure, and the multiple devices may interact with each other to complete the method.

The apparatus according to the above embodiment is used to implement the corresponding method in the above embodiment, and has the beneficial effects of the corresponding method embodiment, which will not be repeated here.

Figure 7:
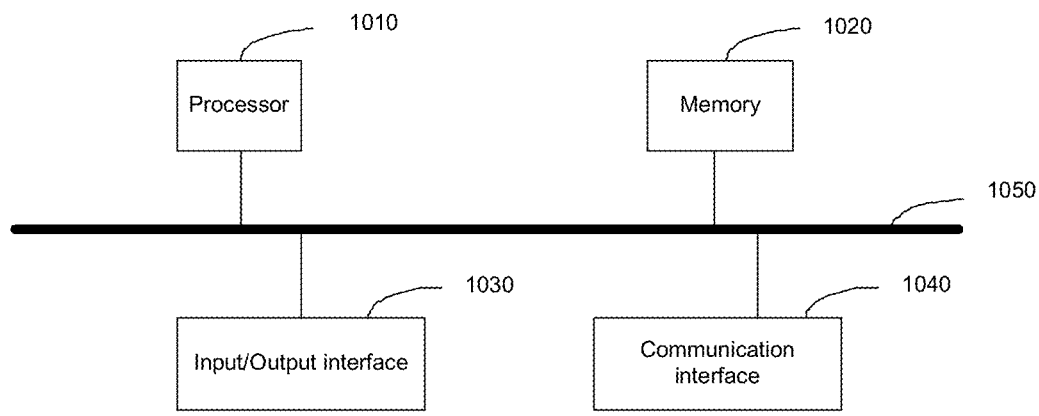
FIG. 7 is a block diagram of an electronic device according to an exemplary embodiment of the present disclosure.

FIG. 7 illustrates a schematic diagram of a more specific hardware structure of an electronic device according to the present embodiment. The device may comprise a processor 1010, a memory 1020, an input/output interface 1030, a communication interface 1040, and a bus 1050. Here, the processor 1010, the memory 1020, the input/output interface 1030, and the communication interface 1040 realize communication connection therebetween within the device through the bus 1050.

The processor 1010 may be implemented by a general-purpose Central Processing Unit (CPU), a microprocessor, an Application Specific Integrated Circuit (ASIC), or one or more integrated circuits etc., for performing related programs to implement the technical solutions according to the embodiments of the present specification.

The memory 1020 may be implemented in a form of Read Only Memory (ROM), Random Access Memory (RAM), static storage device, dynamic storage device etc. The memory 1020 may store an operating system and other application programs. When the technical solutions according to the embodiments of the present specification are implemented by software or firmware, related program codes are stored in the memory 1020 and are invoked and executed by the processor 1010.

The input/output interface 1030 is used to connect input/output modules to realize information input and output. The input/output/modules may be configured as components (not shown in the figure) in the device, or may be externally connected to a device to provide corresponding functions. Here, the input device may comprise a keyboard, a mouse, a touch screen, a microphone, various sensors, etc., and the output device may comprise a display, a speaker, a vibrator, an indicator light, etc.

The communication interface 1040 is used to connect a communication module (not shown in the figure) to implement communication interaction between the device and other devices. Here, the communication module may realize communication in a wired manner (for example, an USB, a network cable, etc.), or may also realize communication in a wireless manner (for example, a mobile network, WIFI, Bluetooth, etc.)

The bus 1050 comprises paths for transferring information between various components (for example, the processor 1010, the memory 1020, the input/output interface 1030, and the communication interface 1040) of the device.

It should be illustrated that although the above device is only illustrated as comprising the processor 1010, the memory 1020, the input/output interface 1030, the communication interface 1040, and the bus 1050, in a specific implementation process, the device may further comprise other components necessary for a normal operation. In addition, it may be understood by those skilled in the art that the above device may also comprise only the components necessary to implement the solutions according to the embodiments of the present specification, rather than all the components shown in the figure.

The computer-readable medium according to the present embodiment includes permanent and non-permanent, movable and non-movable media, and storage of information may be implemented by any method or technology. The information may be computer readable instructions, data structures, modules of programs, or other data. Examples of computer storage media include, but are not limited to, Phase change Random Access Memory (PRAM), Static Random Access Memory (SRAM), Dynamic Random Access Memory (DRAM), other types of Random Access Memories (RAMs), Read-Only Memory (ROM), Electrically Erasable Programmable Read-Only Memory (EEPROM), flash memory or other memory technologies, read-only Compact Disc Read-Only Memory (CD-ROM), Digital Versatile Disc (DVD) or other optical storage, magnetic tape cassettes, magnetic tape magnetic disk storage devices or other magnetic storage devices or any other non-transmission media, which may be used to store information which may be accessed by computing devices.

It should be understood by those of ordinary skill in the art that the discussion of any of the above embodiments is merely exemplary, and is not intended to imply that the scope of the present disclosure (including claims) is limited to these examples. Within the spirit of the present disclosure, technical features in the above embodiments or different embodiments may also be combined, the steps may be implemented in any order, and there are many other variations of the different aspects of the present disclosure as described above, which are not provided in the details for simplicity.

In addition, in order to simplify the description and discussion, and in order not to make the present disclosure difficult to understand, the accompanying drawings provided may or may not show well-known power/ground connections to Integrated Circuit (IC) chips and other components. In addition, the apparatuses may be shown in a form of block diagrams in order to avoid making the present disclosure difficult to understand, and this also takes into account the fact that the details regarding the implementation of the apparatuses in these block diagrams are highly dependent on a platform on which the present disclosure is to be implemented (i.e., these details should be completely within the scope of understanding by those skilled in the art). In a case where specific details (for example, circuits) are set forth to describe exemplary embodiments of the present disclosure, it will be apparent to those skilled in the art that the present disclosure may be implemented without these specific details or with changes in these specific details. Therefore, these descriptions should be considered to be illustrative rather than restrictive.

Although the present disclosure has been described in conjunction with specific embodiments of the present disclosure, many alternatives, modifications, and variations of these embodiments will be apparent to those of ordinary skill in the art based on the foregoing description. For example, the discussed embodiments may be used for other memory architectures (for example, Dynamic RAM (DRAM)).

The embodiments of the present disclosure are intended to cover all such substitutions, modifications, and variations which fall within the broad scope of the appended claims. Therefore, any omissions, modifications, equivalent replacements, improvements, etc. made within the spirit and principle of the present disclosure should be included in the protection scope of the present disclosure.

We claim:

1. A touch data processing method, comprising:
   acquiring a first touch signal detected by a touch screen during a first detection period, and obtaining a first finger model according to the first touch signal;

determining whether a finger is separated from the touch screen according to a change amount of a first touch data in the first finger model relative to a second touch data in a second finger model, wherein the second finger model is obtained according to a second touch signal detected by the touch screen during a second detection period, wherein the first touch signal and the second touch signal are touch signals detected within the same area range, each of the first finger model and the second finger model comprises an area where a finger is in contact with the touch screen and touch data corresponding to respective sub-areas in the area, the second detection period is prior to the first detection period and is adjacent to the first detection period, and the touch data in the second finger model is valid touch data;

determining the first touch data to be valid touch data in response to the finger not being separated from the touch screen, and determining the first touch data to be invalid touch data in response to the finger being separated from the touch screen;

wherein the determining whether the finger is separated from the touch screen according to a change amount of first touch data in the first finger model relative to second touch data in the second finger model comprises:

calculating a first sum of values of touch data corresponding to the respective sub-areas in the first finger model;

calculating a second sum of values of touch data corresponding to the respective sub areas in the second finger model;

calculating a ratio of the second sum to the first sum; and determining that the finger is not separated from the touch screen in response to the ratio of the second sum to the first sum being not greater than a first threshold.

2. The method according to claim 1, further comprising:

determining whether a value of first central touch data in a central sub-area in the first finger model is greater than a second threshold in response to the ratio of the second sum to the first sum being greater than the first threshold; and determining that the finger is not separated from the touch screen in response to the value of the first central touch data being greater than the second threshold.

3. The method according to claim 2, further comprising:

stopping acquiring the touch signal detected by the touch screen for preset duration and then acquiring a touch signal detected by the touch screen again in response to the value of the first central touch data being not greater than the second threshold;

obtaining a third finger model according to the further acquired touch signal detected by the touch screen, wherein the further acquired touch signal detected by the touch screen and the first touch signal are touch signals detected within the same area range;

determining whether a value of second central touch data in a central sub-area in the third finger model is greater than the second threshold; and determining that the finger is not separated from the touch screen and determining the touch data in the second finger model to be valid touch data in response to the value of the second central touch data being greater than the second threshold, and determining that the finger is separated from the touch screen and determining the touch data in the second finger model and the third finger model to be invalid touch data in response to the value of the second central touch data being not greater than the second threshold.

4. The method according to claim 2, wherein the touch data in the second finger model is determined to be valid touch data by:

in response to no other touch signals being detected by the touch screen within a preset number of detection periods before the second touch signal is detected by the touch screen, determining whether a value of third central touch data in the central sub-area in the second finger model is greater than a third threshold; and determining the touch data in the second finger model to be valid touch data in response to the value of the third central touch data being greater than the third threshold, wherein the third threshold is less than the second threshold.

5. A non-transitory computer-readable storage medium having stored therein computer instructions for causing a computer to perform the method according to claim 1.

6. An electronic device, comprising:

a processor; and a memory having stored therein instructions which, when executed by the processor, cause the processor to:

acquire a first touch signal detected by a touch screen during a first detection period, and obtain a first finger model according to the first touch signal;

determine whether a finger is separated from the touch screen according to a change amount of a first touch data in the first finger model relative to a second touch data in a second finger model;

wherein the second finger model is obtained according to a second touch signal detected by the touch screen during a second detection period, wherein the first touch signal and the second touch signal are touch signals detected within the same area range, each of the first finger model and the second finger model comprises an area where a finger is in contact with the touch screen and touch data corresponding to respective sub-areas in the area, the second detection period is prior to the first detection period and is adjacent to the first detection period, and the touch data in the second finger model is valid touch data; and determine the first touch data to be valid touch data in response to the finger not being separated from the touch screen, and determine the first touch data to be invalid touch data in response to the finger being separated from the touch screen;

wherein the instructions which, when executed by the processor, further cause the processor to:

calculate a first sum of values of touch data corresponding to the respective sub-areas in the first finger model;

calculate a second sum of values of touch data corresponding to the respective sub-areas in the second finger model;

calculate a ratio of the second sum to the first sum; and determine that the finger is not separated from the touch screen in response to the ratio of the second sum to the first sum being not greater than a first threshold.

7. The electronic device according to claim 6, wherein the instructions which, when executed by the processor, further cause the processor to:
- determine whether a value of first central touch data in a central sub-area in the first finger model is greater than a second threshold in response to the ratio of the second sum to the first sum being greater than the first threshold; and
- determine that the finger is not separated from the touch screen in response to the value of the first central touch data being greater than the second threshold.

8. The electronic device according to claim 7, wherein the instructions which, when executed by the processor, further cause the processor to:
- stop acquiring the touch signal detected by the touch screen for preset duration and then acquire a touch signal detected by the touch screen again in response to the value of the first central touch data being not greater than the second threshold;
- obtain a third finger model according to the further acquired touch signal detected by the touch screen, wherein the further acquired touch signal detected by the touch screen and the first touch signal are touch signals detected within the same area range;
- determine whether a value of second central touch data in a central sub-area in the third finger model is greater than the second threshold; and
- determine that the finger is not separated from the touch screen and determine the touch data in the second finger model to be valid touch data in response to the value of the second central touch data being greater than the second threshold, and determine that the finger is separated from the touch screen and determine the touch data in the second finger model and the third finger model to be invalid touch data in response to the value of the second central touch data being not greater than the second threshold.

9. The electronic device according to claim 7, wherein the instructions which, when executed by the processor, further cause the processor to:
- in response to no other touch signals being detected by the touch screen within a preset number of detection periods before the second touch signal is detected by the touch screen,
- determine whether a value of third central touch data in the central sub-area in the second finger model is greater than a third threshold; and
- determine the touch data in the second finger model to be valid touch data in response to the value of the third central touch data being greater than the third threshold, wherein the third threshold is less than the second threshold.

* * * * *